US008337093B2

(12) United States Patent
Parkman, III

(10) Patent No.: US 8,337,093 B2
(45) Date of Patent: Dec. 25, 2012

(54) FIBER OPTIC CONNECTORS AND METHODS FOR MAKING THE SAME

(75) Inventor: Louis E. Parkman, III, Richland Hills, TX (US)

(73) Assignee: Corning Cable Systems LLC, Hickory, NC (US)

( * ) Notice: Subject to any disclaimer, the term of this patent is extended or adjusted under 35 U.S.C. 154(b) by 394 days.

(21) Appl. No.: 12/570,924

(22) Filed: Sep. 30, 2009

(65) Prior Publication Data

US 2011/0075972 A1 Mar. 31, 2011

(51) Int. Cl.
*G02B 6/36* (2006.01)

(52) U.S. Cl. ............... 385/78; 385/53; 385/70; 385/72; 385/88; 385/92

(58) Field of Classification Search ............ 385/53, 385/70, 72, 78, 88, 89, 92
See application file for complete search history.

(56) References Cited

U.S. PATENT DOCUMENTS

| 4,445,753 | A  | 5/1984  | Collignon ............... 350/96.21 |
| 5,095,517 | A  | 3/1992  | Monguzzi et al. ........... 385/90 |
| 5,436,994 | A  | 7/1995  | Ott et al. ................... 385/86 |
| 5,661,843 | A  | 8/1997  | Rickenbach et al. ....... 385/147 |
| 5,796,898 | A  | 8/1998  | Lee ........................ 385/78 |
| 5,937,123 | A  | 8/1999  | Frelier ...................... 385/79 |
| 5,946,436 | A  | 8/1999  | Takashi ..................... 385/60 |
| 6,428,215 | B1 | 8/2002  | Nault ....................... 385/78 |
| 6,550,979 | B1 | 4/2003  | Fleenor et al. ............. 385/78 |
| 6,695,489 | B2 | 2/2004  | Nault ....................... 385/78 |
| 6,860,645 | B2 | 3/2005  | Miller et al. ................ 385/81 |
| 6,955,479 | B2 | 10/2005 | Erdman et al. .............. 385/78 |
| 7,018,108 | B2 | 3/2006  | Makhlin et al. ............. 385/78 |
| 7,150,567 | B1 | 12/2006 | Luther et al. ............... 385/78 |
| 7,540,666 | B2 | 6/2009  | Luther et al. ............... 385/59 |
| 2003/0095755 | A1 | 5/2003 | Vaganov et al. ............ 385/88 |
| 2003/0161586 | A1 | 8/2003 | Hirabayashi ................ 385/78 |
| 2010/0303422 | A1* | 12/2010 | Wertman et al. ............. 385/79 |

FOREIGN PATENT DOCUMENTS

| WO | WO 02/052310 A2 | 7/2002 |
| WO | WO 02/052310 A3 | 7/2002 |

OTHER PUBLICATIONS

Patent Cooperation Treaty, International Search Report for International Application No. PCT/US2010/049762, Sep. 22, 2010, 12 pages.

* cited by examiner

*Primary Examiner* — Jennifer Doan
(74) *Attorney, Agent, or Firm* — Michael E. Carroll, Jr.

(57) ABSTRACT

Fiber optic connectors and components for fiber optic connectors with improved side-loading performance are disclosed along with methods for making the same. The fiber optic connector includes a ferrule and a ferrule holder where the ferrule holder may be disposed within a housing. The ferrule holder has a forward portion with a spherical feature for cooperating with the housing, thereby allowing relative movement therebetween. Specifically, the spherical feature of the ferrule holder permits rotational translation of the ferrule holder in two degrees of freedom relative to the housing and inhibits the longitudinal translation of the ferrule holder in same two degrees of freedom relative to the housing, thereby providing improved side-loading performance.

22 Claims, 5 Drawing Sheets

FIBER OPTIC CONNECTORS AND METHODS FOR MAKING THE SAME

BACKGROUND

1. Field

The disclosure is directed to fiber optic connectors and components of a fiber optic connector along with methods for making the same. More specifically, the disclosure is directed to a fiber optic connector having improved cooperation between the ferrule holder and the housing of the fiber optic connector.

2. Technical Background

Optical fiber is increasingly being used for a variety of applications, including but not limited to broadband voice, video, and data transmission. Benefits of optical fiber use include extremely wide bandwidth and low noise operation. With the increasing and varied use of optical fibers, it is important to provide efficient methods of interconnecting optical fibers. Fiber optic connectors have been developed for this purpose. It is important that fiber optic connectors not significantly attenuate or alter the transmitted signal. The fiber optic connector is advantageous since it is reconfigurable (i.e., connected and disconnected a number of times), thereby allowing moves, adds and changes to the optical network. During the initial install of the optical network or during moves, adds, and changes to the optical network forces such as side-forces may be applied to the cable assembly and ultimately to the fiber optic connector. These side-loads applied to the fiber optic cable assembly can cause the ferrules of the fiber optic connector to shift and undesirably attenuate the optical signal.

By way of example, FIG. 1 depicts a conventional fiber optic cable 10 having a ferrule 12 secured within a ferrule holder 14. Ferrule holder 14 is disposed within a housing 16 and held therein by a spring push that snap-fits to housing 16. A spring 15 bias the ferrule holder 14 forward and allows ferrule 12 and ferrule holder 14 to move allowing a suitable amount of contact pressure between ferrules along with inhibiting damage to the ferrule endface. However, if a large enough side-load is applied the ferrule 12 and ferrule holder 14 can shift allowing ferrule 12 to move out of position as represented in FIG. 1. As a result of this side-load, the mated pair of ferrules of the fiber optic connectors can have increased levels of optical attenuation. FIG. 2 shows a schematic representation of fiber optic connectors having respective ferrules 12 and 12' mated within an adapter sleeve 30 when a side-load is transmitted through a fiber optic cable to ferrule 12 of the fiber optic cable assembly.

There is an unresolved a need for an improved fiber optic connector that is simple, reliable, easy to assemble and can easily accommodate side-load forces.

SUMMARY

Embodiments of the disclosure are directed to fiber optic connectors, cable assemblies, and components for fiber optic connectors along with methods of making the same. The fiber optic connectors advantageously allow improved side-loading performance as discussed herein. The fiber optic connector includes a ferrule and a ferrule holder where the ferrule holder may be disposed within a housing. Additionally, the ferrule holder has a forward portion with a spherical feature for cooperating with the housing, thereby allowing relative movement therebetween. Specifically, the spherical feature of the ferrule holder permits rotational translation of the ferrule holder in two degrees of freedom relative to the housing and inhibits the longitudinal translation of the ferrule holder in same two degrees of freedom relative to the housing, thereby providing improved side-loading performance.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION OF THE PREFERRED EMBODIMENTS

Reference will now be made in detail to the preferred embodiments of the disclosure, examples of which are illustrated in the accompanying drawings. Whenever possible, like reference numbers will be used to refer to like components or parts. The embodiments described herein are directed to fiber optic connectors and cable assemblies having a ferrule holder within a housing which permits rotational translation of the ferrule holder in two degrees of freedom relative to the housing and inhibits the longitudinal translation of the ferrule holder in same two degrees of freedom relative to the housing. The concepts disclosed are advantageous since they improve performance of the fiber optic connector under side-load conditions. Reference will now be made in detail to the preferred embodiments, examples of which are illustrated in the accompanying drawings.

Figure 1:
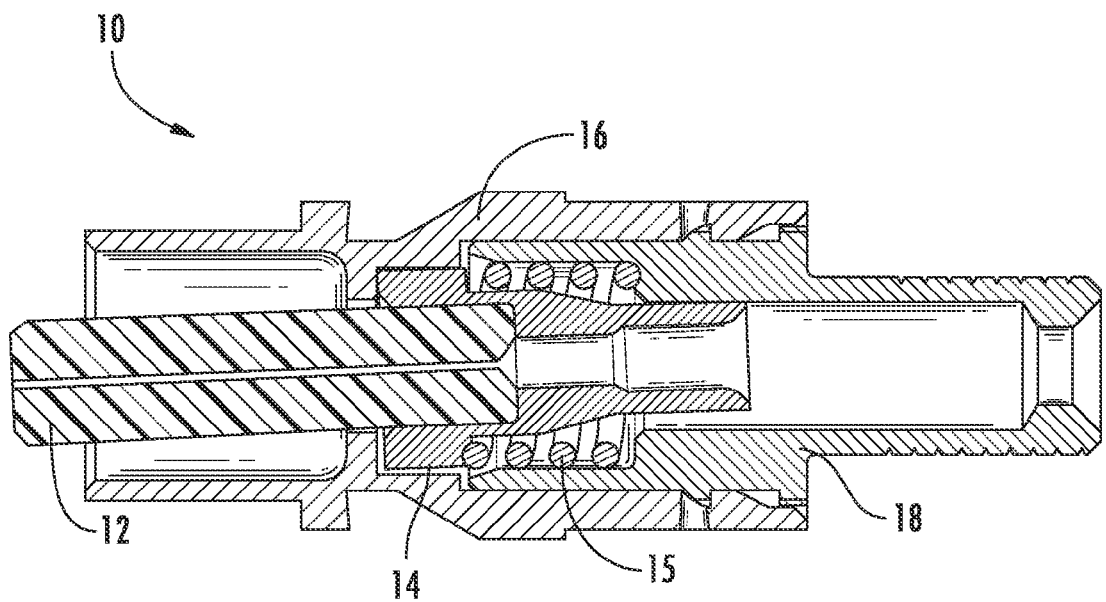
FIG. 1 is a longitudinal cross-sectional view of a conventional fiber optic connector showing the ferrule holder and ferrule displaced under a side-load force.
Figure 2:
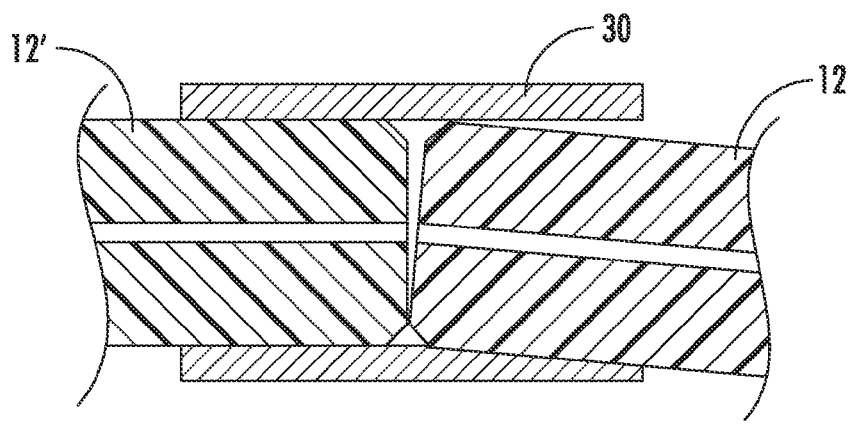
FIG. 2 is a schematic illustration showing the ferrules of a mated pair of fiber optic connectors being separated when a side-load is applied to one of the fiber optic connectors, thereby causing attenuation in the mated pair.
Figure 3:
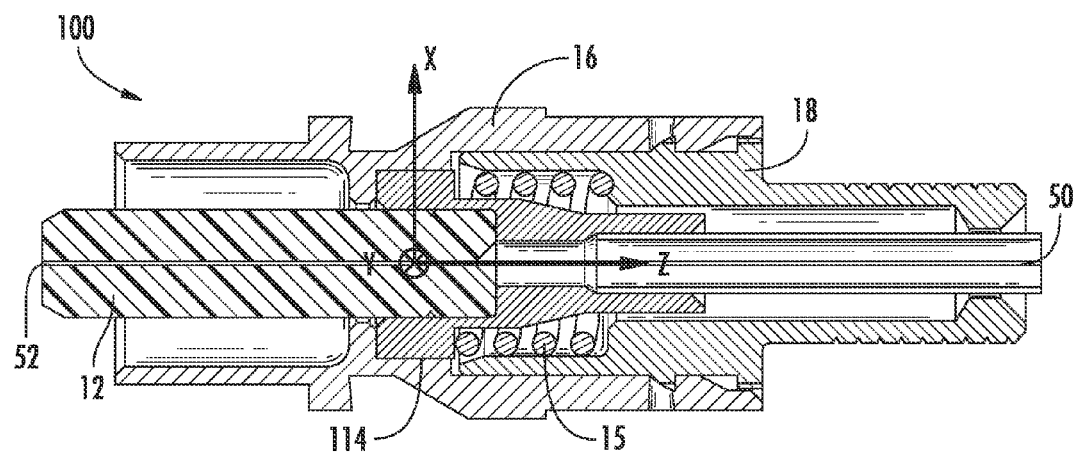
FIG. 3 is a longitudinal cross-sectional view of a fiber optic connector having a ferrule holder that improves side load performance.

FIG. 3 illustrates a cross-sectional view of an explanatory fiber optic connector 100 having a ferrule 12 disposed in a ferrule holder 114. Ferrule 12 may hold an optical fiber 52 of fiber optic cable 50 that is strain relieved to the fiber optic connector 100 in a suitable manner, thereby forming a fiber optic cable assembly (not numbered). A portion of ferrule holder 114 is received in a housing 16 and cooperates with the ferrule holder 114, thereby allowing relative movement therebetween in specific orientations as described below. Fiber optic connector 100 also includes a spring 15 for biasing the ferrule holder 114 forward within housing 16. Fiber optic connector 100 is assembled so that spring 15 and ferrule holder 114 are secured within housing 16 using a spring push 18 that snap-fits using latches and windows (not numbered) to a portion of housing 16. Fiber optic connector 100 and ferrule holder 114 are advantageous since they have an improved optical performance when subjected to a side-load force. More specifically, ferrule holder 114 has a forward portion (not numbered) with a spherical feature 115 that allows rotational translation of the ferrule holder 114 in two degrees of freedom and inhibits the longitudinal translation of the ferrule holder 114 in the same two degrees of freedom relative to housing 16. The concepts disclosed herein are suitable with other fiber optic connectors and/or fiber optic cables. For instance, the fiber optic connector can have a multi-fiber ferrule such as shown in FIG. 5 or other suitable fiber optic connectors including the multi-fiber ferrule.

The degrees of freedom are defined as an orthogonal axis system where the positive Z-direction is to the right, the positive X-direction is up and the positive Y-direction is into the paper as best shown in FIG. 3. The spherical feature permits the ferrule holder 114 rotational translation in two degrees of freedom relative to housing 16 and inhibits the longitudinal translation of the ferrule holder in same two degrees of freedom relative to housing 16. For instance, ferrule holder 114 has rotational translation in the X-Z plane about the Y-axis and the Y-Z plane about the X-axis. Further, ferrule holder 114 inhibits longitudinal translation along the X-axis and along the Y-axis. In other words, ferrule holder 114 can rotate about the X and Y axes and is inhibited from longitudinal translation the X and Y axes and ferrule holder 114 essentially longitudinally translates along the Z-axis (i.e., the ferrule holder can move forward and backward direction in the Z-direction and is biased forward by the spring.) Additionally, the keying features inhibit the rotation of ferrule holder 114 about the Z-axis.

Figure 4:
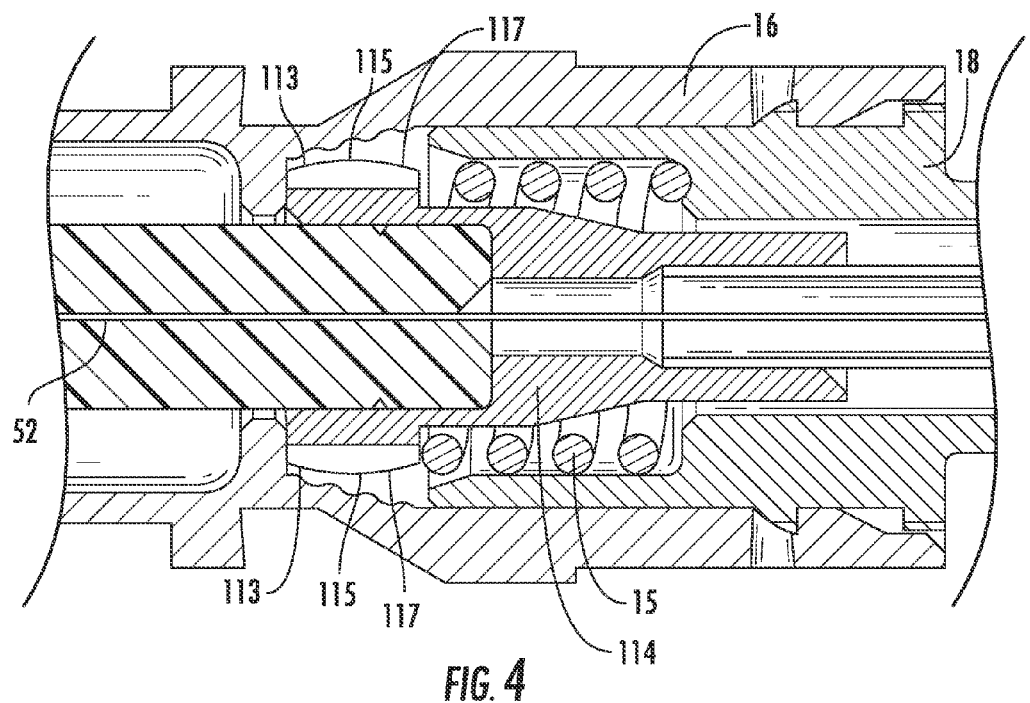
FIG. 4 is a detailed longitudinal cross-sectional view of the fiber optic connector of FIG. 3 having a portion of the housing removed for clarity of the ferrule holder.

FIG. 4 illustrates a detailed cross-sectional view of a portion of fiber optic connector 100 showing the details of ferrule holder 114. Portions of housing 16 adjacent to the keying features of ferrule holder 114 are removed (i.e., at the top and bottom as represented by the undulating lines) so that the profile of the ferrule holder 114 is visible. The forward portion of ferrule holder 114 may also include other geometry adjacent to spherical portion 115. For instance, this embodiment of ferrule holder 114 includes a first tapered portion 113 forward of spherical portion 115 and a second tapered portion 117 rearward of spherical portion 115. In other words, the first tapered portion 113 and the second tapered portion 117 are disposed on opposite sides of spherical feature 115. Arranging the tapered portions on opposite sides of the spherical feature 115 allows the ferrule holder to rotate forward or backward relative to its normal position when no side-load is applied, but other embodiments can have other geometries on opposite sides of the spherical feature 115. The first tapered portion 113 is tapered in a first direction and the second tapered portion 117 is tapered in a second direction relative to a longitudinal axis of the fiber optic connector 100. By way of example, the first tapered portion has an angle of ten degrees or less from the longitudinal axis and the second tapered portion has an angle of minus ten degrees or less from the longitudinal axis. As used herein, a spherical feature means that a portion of the ferrule holder that moves relative to the housing has a curved surface, but not an exact spherical surface in the strict mathematical sense.

Figure 5:
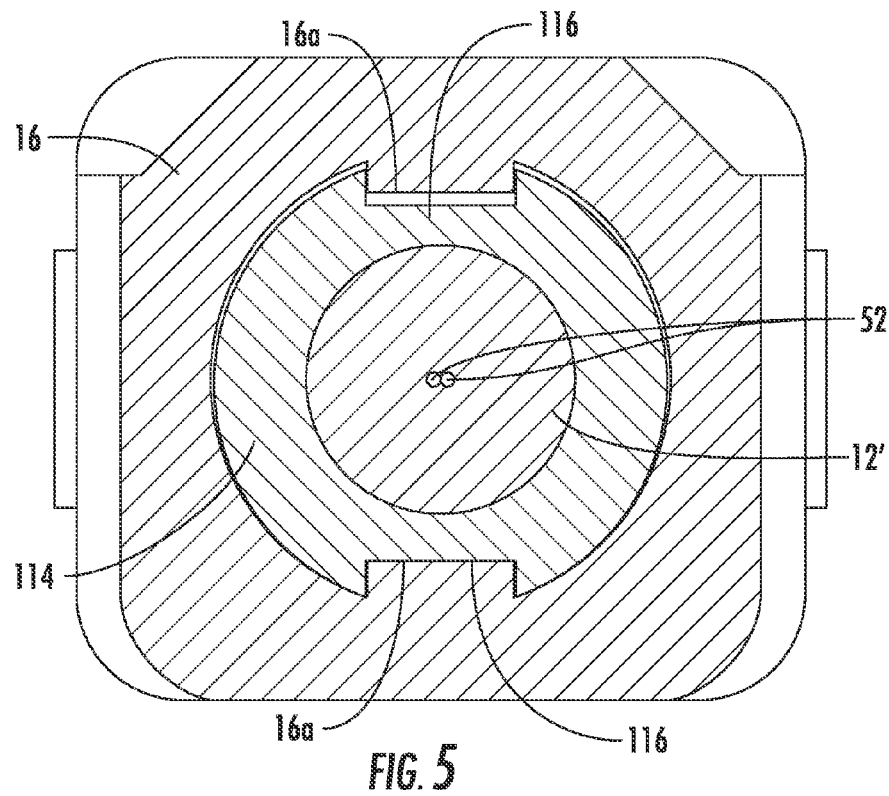
FIG. 5 is a transverse cross-sectional view of a multi-fiber fiber optic connector at a forward portion of the ferrule holder showing keying features.

FIG. 5 depicts a transverse cross-sectional view of fiber optic connector similar to fiber optic connector 100, but that includes a multifiber ferrule 12' securing multiple optical fibers 52. Specifically, FIG. 5 depicts the cross-sectional view thru the forward portion of the ferrule holder 114. As shown, ferrule holder 114 includes at least one keying feature 116. More specifically, the forward portion of this embodiment of the ferrule holder includes a first key at the top and a second key at the bottom. Stated another way, the first and second key are disposed on opposite sides of the forward portion of the ferrule holder. As illustrated in FIG. 5, the ferrule holder 114 has a female keying feature (i.e., the groove) that cooperates with a male keying feature 16a of housing 16. However, other embodiments may include a male keying feature on the ferrule holder and a cooperating female keying feature on the housing. In other embodiments, the keying features may allow the ferrule holder 114 to snap-fit into housing 16. For instance, the male keying feature 16a of housing 16 snap-fits with keying features 116 of ferrule holder 114, thereby inhibiting disconnection therebetween.

Figure 6:
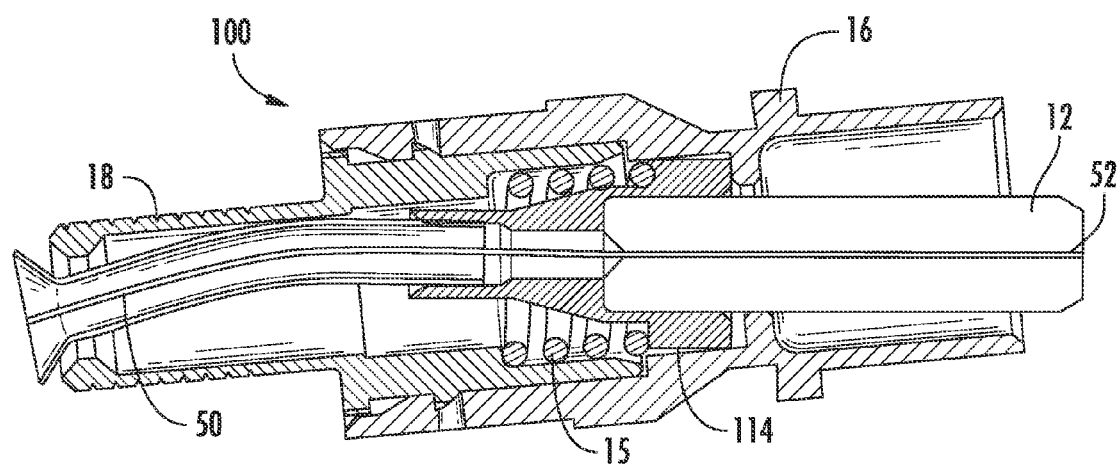
FIG. 6 is a longitudinal cross-sectional view of the fiber optic connector showing the ferrule holder and ferrule displaced under a side-load force.

FIG. 6 is a longitudinal cross-sectional view of fiber optic connector 100 showing the maximum displacement of ferrule holder 114 and ferrule 12 under a side-load force. In other words, ferrule holder 114 is not touching the entirety of the annular seat of housing 16 due to the side-load force. As shown in this cross-sectional view, the ferrule holder 114 has rotational translation about the Y-axis and longitudinal translation in the Z-direction. In other words, ferrule holder 114 is not touching the entirety of the annular seat of housing 16 due to the side-load force. Additionally, fiber optic connector 100 may inhibit the damage and/or deformation to the ferrule holder 114 or housing 16.

Figure 7:
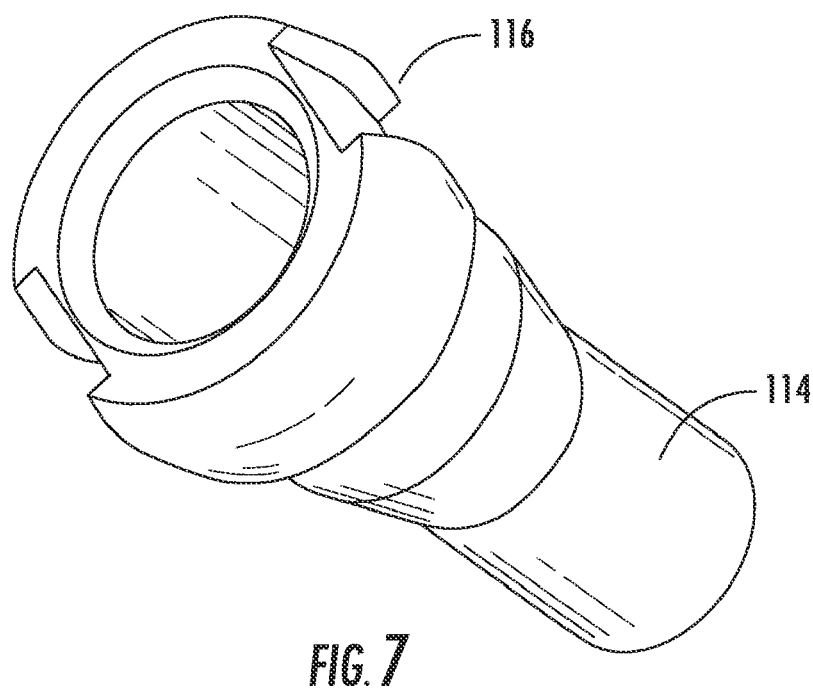
FIGS. 7 and 8 respectively are a perspective view and a top view showing the ferrule holder of FIG. 3.
Figure 8:
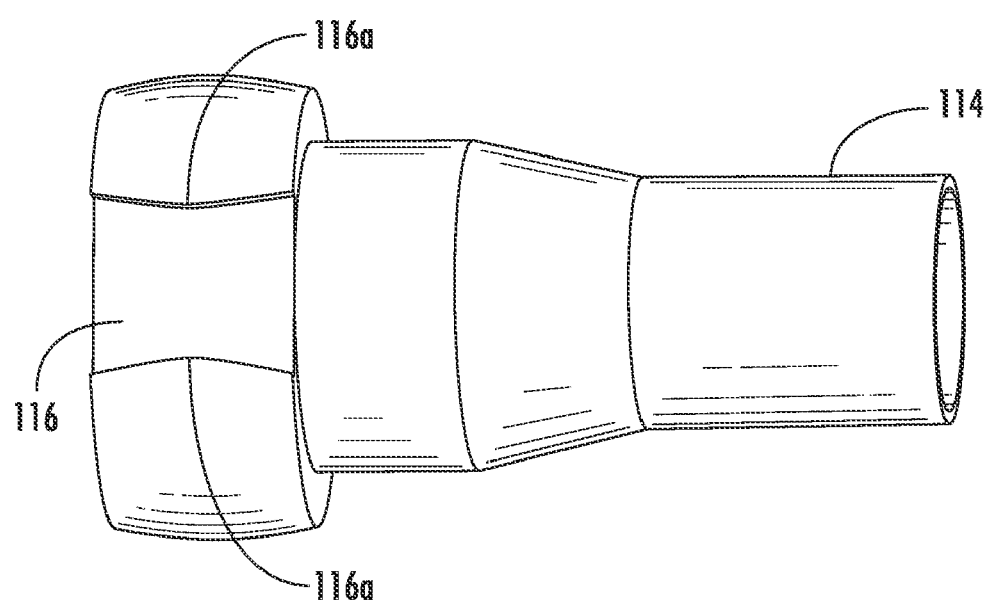

FIGS. 7 and 8 respectively are a perspective view and a top view showing ferrule holder 114. FIG. 7 shows that the forward portion of ferrule holder 114 has a flat front face that is biased against a seat (not numbered) of housing 16. The portion of the ferrule holder 114 that receives ferrule 12 may also include a chamfer or relieved surface such as a curved surface to aid in assembly. As best shown in FIG. 8 keying features 116 have a profile (not numbered) shaped for allowing ferrule holder 114 to rotate about the X-axis when disposed within housing 16. Simply stated, the profile of the keying features 116 have two relatively shallow V-like portions 116a that are generally aligned with the spherical portion 115 forming an hourglass like profile, thereby allowing ferrule holder 114 to rotate about the X-axis relative to housing 16. The spherical portion 115 allows ferrule holder 114 to rotate about the Y-axis relative to housing 16 as best shown in FIG. 4.

Figure 9:
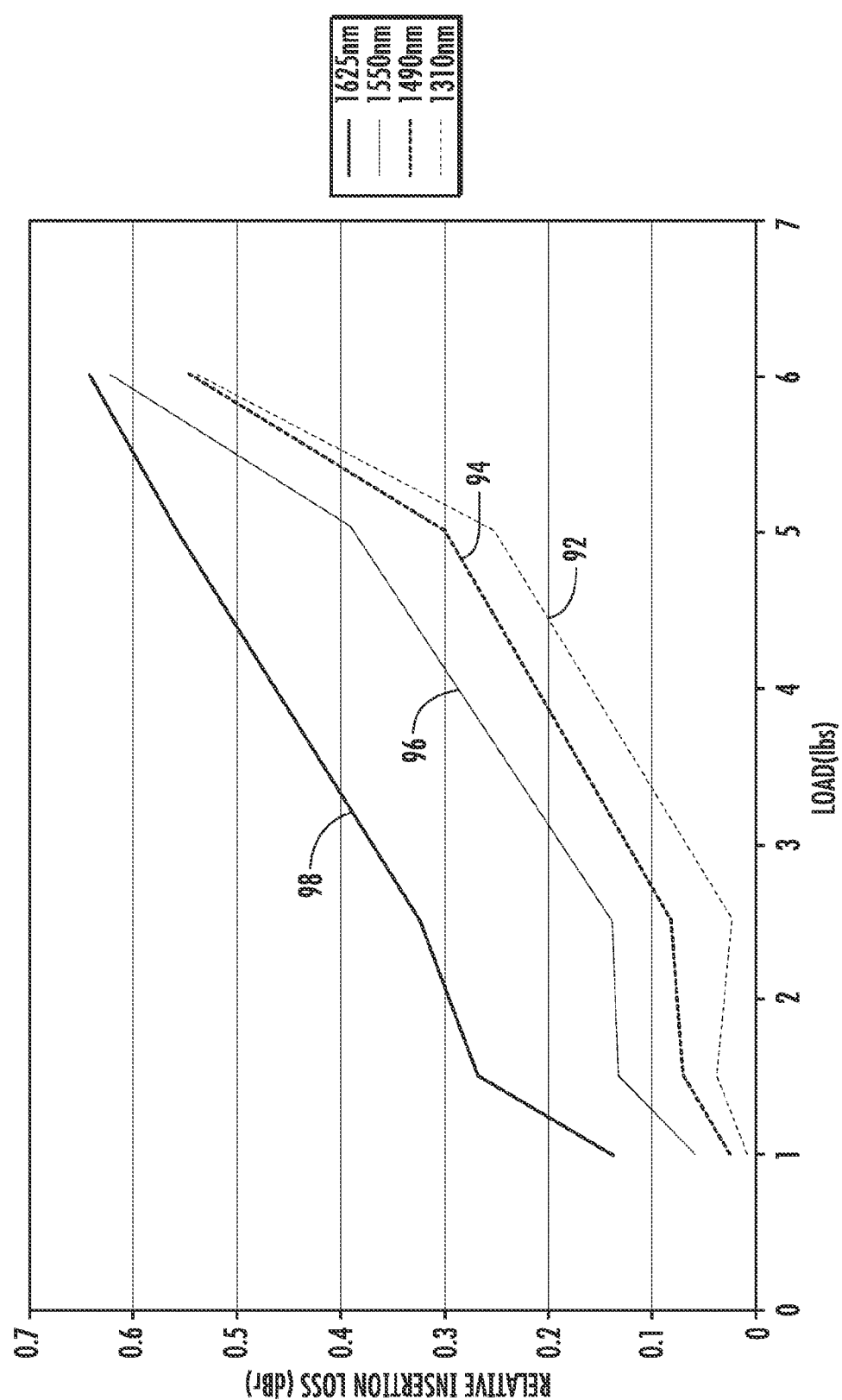
FIG. 9 is a graph showing the delta attenuation of the fiber optic connector of FIG. 3 at various side-load forces and reference wavelengths.

FIG. 9 graphically depicts test data for fiber optic connector 100 as a function of applied side-load for different reference wavelengths. More specifically, FIG. 9 depicts delta attenuation curves for fiber optic connector 100 as a function of a side-load test at four different reference wavelengths: 1310 nm, 1490 nm, 1550 nm, and 1625 nm as depicted by the legend and respectively represented by curves 92, 94, 96, and 98. A similar optical performance test is Telecordia GR-326-CORE; section 4.4.3.5, titled "Transmission with Applied Load" which specifies a delta attenuation of 0.5 dB or less with a 4.4 pound force applied to the cable assembly at a reference wavelength of 1550 nm. Another similar test of optical performance is provided by IEC-61753 titled "Transmission with Applied Load" which specifies a delta attenuation of 0.5 dB or less with a 4.4 pound force applied to the cable assembly at a reference wavelength of 1550 nm. The side-load testing conducted and disclosed herein used the set-up described by the GR-326 test but applied a varying pre-determined side-load force on the fiber optic cable as described in the GR-326 test. The testing show in FIG. 9 is an average delta insertion loss of twelve fiber optic connectors 100.

As shown and expected, maintaining the optical performance is more difficult as the reference wavelength increases (i.e., the optical performance is better at 1310 nm compared with 1625 nm at the same load). On the other hand, the optical performance of fiber optic connector 100 provides a significant improvement with a larger applied side-load force of 5 pounds at the same reference wavelength of 1550 nm. By way of example, curve 96 shows that the fiber optic connector has an average delta insertion loss of 0.40 dB or less during a side-loading test applying five pounds force at a reference wavelength of 1550 nm. Additionally, curve 98 shows that the fiber optic connector has an average delta insertion loss of 0.65 dB or less during a side-loading test applying six pounds force at a reference wavelength of 1625 nm.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present invention without departing from the spirit and scope of the same. Thus, it is intended that the present invention cover the modifications and variations of this invention provided they come within the scope of the appended claims and their equivalents.

I claim:

1. A fiber optic connector, comprising:
   a ferrule;
   a ferrule holder having a forward portion with a spherical feature, the forward portion of the ferrule holder includes a first key and a second key disposed on opposite sides of the forward portion of the ferrule holder; and
   a housing for receiving a portion of the ferrule holder, wherein the housing cooperates with the spherical feature of the ferrule holder to permit rotational translation of the ferrule holder in two degrees of freedom relative to the housing and inhibit the longitudinal translation of the ferrule holder in same two degrees of freedom relative to the housing.

2. The fiber optic connector of claim 1, wherein the forward portion includes a first tapered portion and a second tapered portion on opposite sides of the spherical feature of the ferrule holder.

3. The fiber optic connector of claim 1, wherein the ferrule holder snap-fits with the housing.

4. The fiber optic connector of claim 2, wherein the first tapered portion has an angle of ten degrees or less from a longitudinal axis and the second tapered portion has an angle of minus ten degrees or less from the longitudinal axis.

5. The fiber optic connector of claim 1, the fiber optic connector further including a spring and the forward portion of the ferrule holder has a flat front face.

6. The fiber optic connector of claim 1, wherein the ferrule is a multi-fiber ferrule.

7. The fiber optic connector of claim 1, wherein the fiber optic connector is a portion of a fiber optic cable assembly.

8. The fiber optic connector of claim 6, wherein the fiber optic connector has an average delta insertion loss of 0.40 dB or less during a side-loading test applying five pounds force at a reference wavelength of 1550 nm.

9. A fiber optic connector, comprising:
   a ferrule;
   a ferrule holder having a forward portion with a spherical feature and a keying feature; and
   a housing for receiving a portion of the ferrule holder, wherein the housing cooperates with the spherical feature of the ferrule holder to permit rotational translation of the ferrule holder in two degrees of freedom relative to the housing and inhibit the longitudinal translation the ferrule holder in same two degrees of freedom relative to the housing.

10. The fiber optic connector of claim 9, wherein the forward portion includes a first tapered portion and a second tapered portion on opposite sides of the spherical feature of the ferrule holder.

11. The fiber optic connector of claim 10, wherein the first tapered portion has an angle of ten degrees or less from a longitudinal axis and the second tapered portion has an angle of minus ten degrees or less from the longitudinal axis.

12. The fiber optic connector of claim 9, wherein the keying feature includes a first key and a second key disposed on opposite sides of the forward portion of the ferrule holder.

13. The fiber optic connector of claim 9, wherein the ferrule holder snap-fits with the housing.

14. The fiber optic connector of claim 9, the fiber optic connector further including a spring and the ferrule holder has a flat front face.

15. The fiber optic connector of claim 9, wherein the ferrule is a multi-fiber ferrule.

16. The fiber optic connector of claim 9, wherein the fiber optic connector is a portion of a fiber optic cable assembly.

17. The fiber optic connector of claim 16, wherein the fiber optic connector has an average delta insertion loss of 0.40 dB or less during a side-loading test applying five pounds force at a reference wavelength of 1550 nm.

18. A method of making a fiber optic connector, comprising the steps of:
   providing a housing;
   providing a ferrule holder having a forward portion with a spherical feature and at least one keying feature; and
   inserting the ferrule holder into the housing, wherein the housing cooperates with the spherical feature of the ferrule holder to permit rotational translation of the ferrule holder in two degrees of freedom relative to the housing and inhibit longitudinal translation the ferrule holder in same two degrees of freedom relative to the housing.

19. The method of claim 18, further including the step of attaching a ferrule to the ferrule holder.

20. The method of claim 18, further including providing a spring to bias the ferrule holder forward.

21. The method of claim 18, further including the step of aligning the at least one keying feature of the ferrule holder with a cooperating feature of the housing.

22. The method of claim 18, further including the step of attaching the fiber optic connector to a fiber optic cable.

* * * * *